June 2, 1936. B. HENRICKSEN 2,042,937
POWER SYSTEM FOR ELEVATORS AND THE LIKE
Filed Dec. 4, 1934 2 Sheets-Sheet 1

INVENTOR.
Bjarne Henricksen
BY
Ramsey + Kent
his ATTORNEYS

Patented June 2, 1936

2,042,937

UNITED STATES PATENT OFFICE 2,042,937

POWER SYSTEM FOR ELEVATORS AND THE LIKE

Bjarne Henricksen, North Bergen, N. J., assignor to Sedgwick Machine Works, Incorporated, Poughkeepsie, N. Y., a corporation of New York Application December 4, 1934, Serial No. 755,915

6 Claims. (Cl. 192—2)

This invention relates to power systems for elevators and the like and is particularly appropriate for freight and passenger elevators of relatively small capacity, though there is no particular limit to the load for which the system may be designed. The form of the invention herein disclosed is directly applicable to elevators of the type disclosed in patent to Henricksen 1,923,034, and constitutes improvements upon some of the features shown in that patent.

Among the objects of the invention are to improve power systems for elevators and the like by simplifying them, increasing their reliability, reducing their cost, and increasing their safety. Another and important object of the invention is to provide a compact power system that can be installed in a restricted space and be suitable for driving elevators or moving other loads.

In the form of the invention disclosed, the elevator carrier, car, or other load, is actuated by an endless chain which is driven by an electric motor that always rotates in one direction. Associated with the motor is a brake which is biased in "set" position, i. e., it normally holds the motor and the elevator car stationary. When the car or carrier is to be moved, the brake is positively retracted and is subsequently released automatically at the proper time to permit it to again move to "set" position and bring the carrier to rest at the new station. The retraction of the brake and the operation of power switches for operatively energizing the motor are controlled by a solenoid plunger mounted immediately above the motor. All control switches (service, safety, and emergency), are located in the solenoid circuit, and hence such switches carry only the relatively small amount of current required to energize the solenoid.

Fig. 3 is a schematic diagram showing the circuits of the power system.

Figure 1:
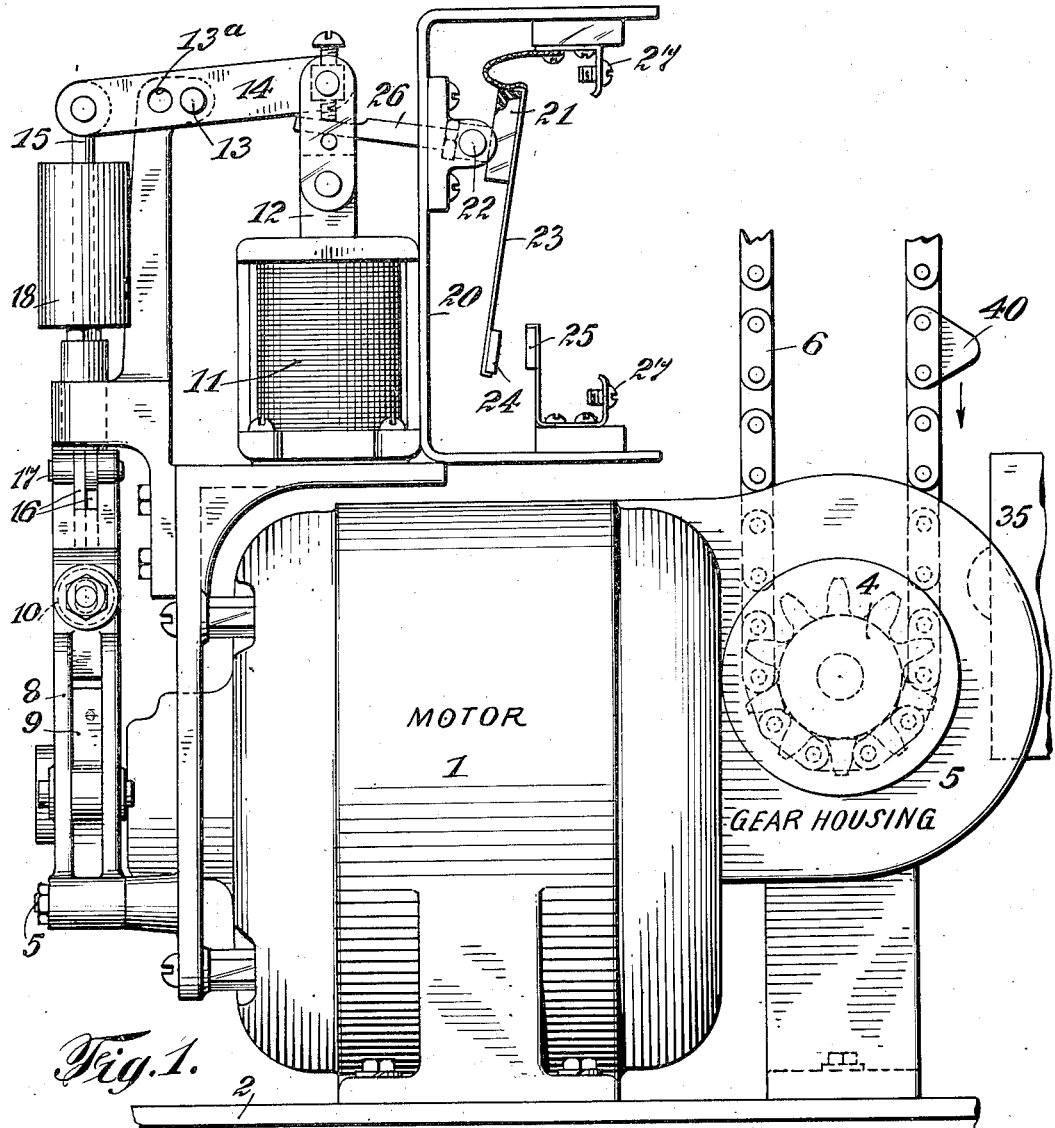
Fig. 1 is a back elevation of the power unit including the motor, brake, solenoid, motor switch, and driving connection to the carrier chain.

An electric motor 1 is bolted to a supporting base 2 and drives a sprocket 4 through suitable gearing, such as worm gearing, located in gear housing 5. Sprocket 4 drives suitable carrier actuating means shown as a chain 6. A brake drum 7 is keyed by a key 1$^a$ directly to the shaft 1$^b$ of the motor; and the shaft and key may project to receive a crank for hand operation. Pivoted at 3, 3 on each side of the drum are brake arms 8, 8. Pivoted to the brake arms are lined brake shoes 9, 9, and the brake arms are biased toward one another by helical springs 10, 10 so that the brake is biased into "set" position, i. e., the brake shoes are normally in contact with the brake drum.

Figure 2:
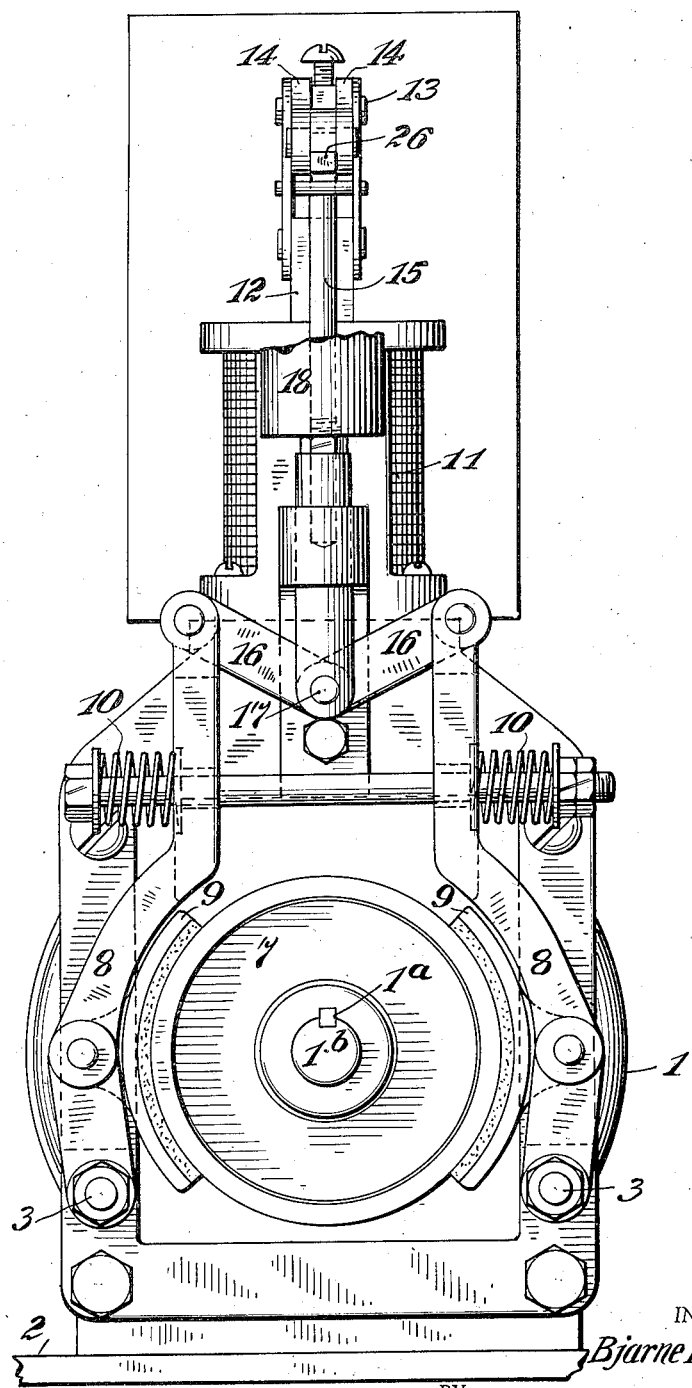
Fig. 2 is a side elevation of the power unit, showing primarily the brake and the solenoid actuated mechanism for controlling the same.

Mounted immediately above the motor is a solenoid 11 having a plunger 12. Pivoted by pin 13 is a walking beam 14 which is connected to plunger 12 and connecting rod 15, so that connecting rod 15 is moved vertically (in the opposite direction) in response to movement of plunger 12. The same brake parts are used with motors of different ratings and a degree of adjustment of the brake may be effected by shifting pivot pin 13 to holes 13$^a$. The free ends of the brake arms 8, 8 are connected together by a toggle joint formed by links 16, 16; and connecting rod 15 is connected to the pivot 17 of the toggle joint. When the solenoid 11 is energized the plunger 12 is drawn downwardly, thus moving connecting rod 15 upwardly and actuating the toggle joint (see Fig. 2) to move the brake arms 8, 8 outwardly and retract the brake. When solenoid 11 is de-energized, a weight 18 applies force to the pivot 17 of the toggle joint, thereby moving it downwardly and, in conjunction with springs 10, 10, restoring the brake to "set" condition. If desired, the springs 10, 10 may be omitted and weight 18 designed to apply all of the brake setting force.

Mounted adjacent the solenoid 11 is a switch housing 20, which incloses heavy duty switching contacts for controlling the motor circuit. The motor switch comprises an insulating switch frame 21, pivotally mounted at 22 and carrying side by side a plurality of switch arms 23 (one shown) having contacts 24. The number of switch arms used depends upon the number of lead wires to the motor, direct current motors and single phase motors having ordinarily two lead wires, and two phase and three phase motors having ordinarily three wires. Movable switch contacts 24 cooperate with stationary contacts 25 (one shown); and a lever arm 26 operatively connects the switch frame 21 with solenoid plunger 12, so that circuit is made and broken at 25 upon energization and de-energization of the solenoid. Wiring connection to the motor switch is made at 27, 27.

The circuit shown in Fig. 3 is suitable for a two landing elevator installation having shaft doors at each of the landings, a two lead motor being used to drive the elevator. The power line is represented by wires 30, 30; and connected between the wires are a power circuit designated as a whole by 31, and a control circuit designated as a whole by 32. The control circuit 32 includes the solenoid 11, door safety switches 34, 34 (located at the respective landings and arranged to be closed only when the doors are closed) service stop switch 35 (located adjacent sprocket 4), emergency stop switch 36 (located in the car or at any other point desired) and starting switches 37 and 38. In dumb-waiter installations, one of the starting switches 37 and 38 may be placed at each landing; and in passenger elevators an additional starting switch may be placed in the car. The power circuit includes the motor 1 and power contacts 24 and 25.

With the elevator at rest after a normal stop, switches 34, 34 and 36 are closed and switch 35 is open. Depression of either of the push-button starting switches 37 and 38 completes the control circuit through the solenoid 11; and the energization of the solenoid 11 moves the plunger 12 to retract the brake and close power contacts 24 and 25 and start the motor. As the carrier approaches the other landing, one of two cams 40 (one shown) carried by the chain 6 engages service stop switch 35 and opens the same, thereby breaking the control circuit 32 and de-energizing the solenoid 11. Under the action of weight 18, the solenoid plunger 12 rises, and power contacts 24 and 25 are opened to de-energize the motor. Springs 10, 10 also set the brake and bring the carrier to rest at the new landing. To return the carrier to the first landing, one of the starting switches 37, 38 is closed and the motor starts as before. The cam 40 which was engaging switch 35, immediately leaves it, so service switch 35 closes and maintains control circuit 32. As the carrier approaches the first landing, the other cam 40 on chain 6, engages service stop switch 35 and stops the car as before.

In case of emergency, switch 36 can be depressed to break the control circuit, thereby de-energizing the solenoid and arresting the car wherever it may be. In actual operation, the parts would not arrive in the position shown in Fig. 1 except through such an emergency stop, as under normal operating conditions contacts 24, 25 would not be opened until cam 40 had engaged service stop switch 35. However, an emergency stop position of parts is shown in this figure because it enables the parts to be shown to better advantage.

It will be noted that the construction is extremely simple and lends itself to quantity production and fairly complete assembly of parts at the factory. The motor, brake, solenoid, and power switch are all combined in a simple compact unit which can be completely assembled at the factory. The circuits are exceedingly simple; and the service control switches and the emergency and safety switches, may all be of very light duty type, as they carry only the relatively small current required to energize the solenoid 11. Also no wiring which needs to be carried to the car or to any of the landings is required to carry more than the small amount of current required to energize the solenoid 11. The power line 30, 30 is brought into the motor, and the motor current is handled only by the contacts 24 and 25 and the leads from them to the motor, all of which are located right at the motor unit.

The invention may, of course, be embodied in forms other than the one particularly disclosed, and hence the disclosure is merely illustrative of the best form in which I have contemplated applying my invention and is not to be considered as limiting the scope of the accompanying claims.

I claim:

1. Power apparatus comprising: carrier actuating means; an electric motor mechanically connected to said carrier actuating means to drive the same; a solenoid and a member magnetically actuated thereby, both mounted above the motor; a brake drum connected to the motor; vertically disposed brake arms positioned on opposite sides of said brake drum and pivoted adjacent to their lower ends; brake shoes carried by the brake arms; springs engaging the brake arms to bias the brake shoes against the drum; a toggle joint connecting the brake arms and operable to spread the brake arms and thereby retract the brake shoes from the drum; an operating connection from the toggle joint to the solenoid actuated member to operate the toggle joint and release the brake upon energization of the solenoid; a power circuit to operatively energize the motor, said circuit including switching means located adjacent to the motor to open and close the power circuit; a mechanical connection from said switching means to said solenoid actuated member operative to actuate the switching means and close the motor circuit upon energization of the solenoid; and a control circuit including in series the solenoid, a service switch, and safety and emergency switches, some of the control circuit switches being located remotely from the motor, and the control circuit switches and the solenoid being excluded from said power circuit.

2. Power apparatus comprising carrier actuating means; an electric motor mechanically connected to said carrier actuating means to drive the same; a brake mechanically connected to said motor, said brake including means to bias the brake in set position; a solenoid having a magnetically actuated member mechanically connected to said brake and operative to retract the brake upon energization of the solenoid; switching means also mechanically connected to said magnetically actuated member and electrically connected to operatively energize the motor upon energization of the solenoid; and a control circuit including in series the solenoid, a service stop switch, door safety switches and an emergency stop switch, some of the control circuit switches being located remotely from the motor, and such remotely located switches and the solenoid being excluded from said power circuit.

3. Power apparatus comprising: carrier actuating means; an electric motor mechanically connected to said carrier actuating means to drive the same; a brake mechanically connected to said motor, said brake including means to bias the brake in set position; a solenoid having a magnetically actuated member mechanically connected to said brake and operative to retract the brake upon energization of the solenoid; switching means also mechanically connected to said magnetically actuated member and electrically connected to operatively energize the motor upon energization of the solenoid; and a control circuit including in series, the solenoid, a service switch, and safety and emergency switches, some of the control circuit switches being located remotely from the motor, and such remotely located switches and the solenoid being excluded from the circuit carrying the motor current.

4. Power apparatus comprising: carrier actuating means; an electric motor; mechanical connection from one end of the motor shaft to the carrier actuating means to drive the same; a brake drum connected to the other end of the motor shaft; vertically disposed brake arms positioned on opposite sides of said brake drum and pivoted adjacent to their lower ends; brake shoes carried by the brake arms; springs engaging the brake arms to bias the brake shoes against the drum; a toggle joint connecting the upper ends of the brake arms and operable to spread the brake arms and thereby retract the brake shoes from the drum; a vertically positioned solenoid and plunger mounted above said motor; a walking beam connection between the toggle joint and said plunger to effect retraction of the brake upon energization of the solenoid; a weight positioned to bias downwardly the toggle joint end of the walking beam; a power circuit to operatively energize the motor, said circuit including a switch positioned adjacent said solenoid; a connection from said switch to the solenoid plunger to throw the switch and energize the motor when the solenoid is energized; and a control circuit to energize the solenoid, said control circuit including safety switches located remotely from the motor and a service switch, said safety switches and the solenoid being excluded from said power circuit.

5. Power apparatus comprising: carrier actuaating means; an electric motor; mechanical connection from one end of the motor shaft to the carrier actuating means to drive the same; a brake drum connected to the other end of the motor shaft; vertically disposed brake arms positioned on opposite sides of said brake drum and pivoted adjacent to their lower ends; brake shoes carried by the brake arms; means to bias the brake shoes against the drum; a toggle joint connecting the upper ends of the brake arms and operable to spread the brake arms and thereby retract the brake shoes from the drum; a vertically positioned solenoid and plunger mounted above said motor; a walking beam connection between the toggle joint and said plunger to effect retraction of the brake upon energization of the solenoid; a power circuit to operatively energize the motor, said circuit including a switch positioned adjacent to said solenoid; a connection from said switch to the solenoid plunger to throw the switch and energize the motor when the solenoid is energized; and a control circuit to energize the solenoid.

6. Power apparatus comprising carrier actuating means; an electric motor mechanically connected to said carrier actuating means to drive the same; a brake mechanically connected to said motor, said brake including a spring and a weight both effective to bias the brake in set position; a solenoid having a magnetically actuated member mechanically connected to said brake and operative to retract the brake upon energization of the solenoid; switching means also mechanically connected to said magnetically actuated member and electrically connected to operatively energize the motor upon energization of the solenoid; and a control circuit to energize the solenoid.

BJARNE HENRICKSEN.